Figure 1:
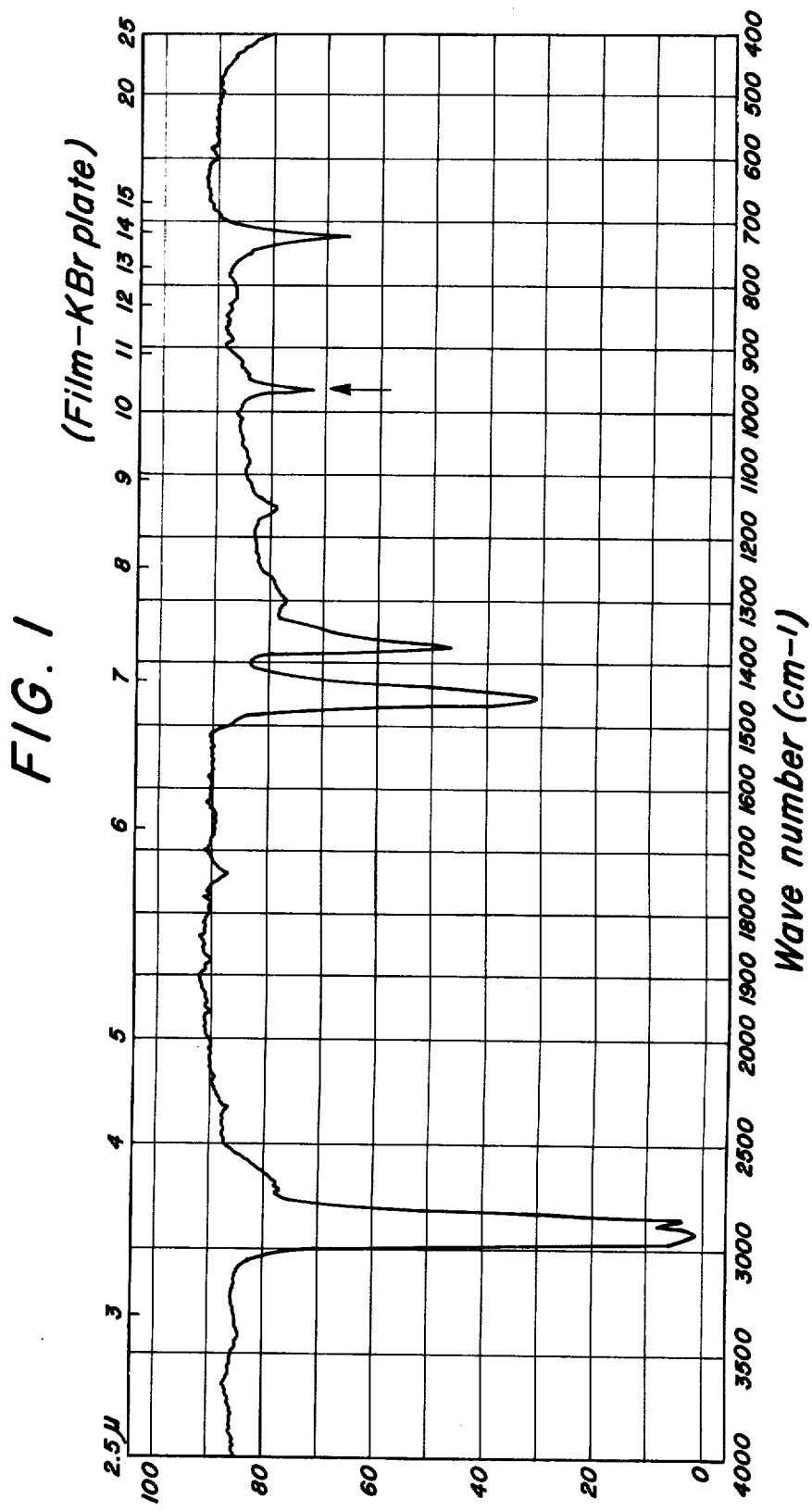

United States Patent [19]

Yukuta et al.

[11] 3,933,768

[45] Jan. 20, 1976

[54] METHOD OF PRODUCING DIHALOCYCLOPROPANE FUNCTIONAL MULTICOMPONENT COPOLYMERS

[75] Inventors: Toshio Yukuta; Takao Aoki; Kazuo Haga; Takashi Ohashi, all of Kodaira; Masumi Saito, Tanashi, all of Japan

[73] Assignee: Bridgestone Tire Company Limited, Tokyo, Japan

[22] Filed: Aug. 28, 1972

[21] Appl. No.: 283,956

[30] Foreign Application Priority Data

Sept. 2, 1971  Japan.............................. 46-67016

[52] U.S. Cl.......... 260/80.78; 260/80.6; 260/96 HA
[51] Int. Cl.²...................... C08F 236/22; C08F 8/24; C08C 19/18
[58] Field of Search........... 260/80.78, 87.5 C, 80.6, 260/88.2 S, 96

[56] References Cited
UNITED STATES PATENTS

| | | | |
|---|---|---|---|
| 3,162,620 | 12/1964 | Gladding........................ | 260/80.78 |
| 3,369,012 | 2/1968 | Lundberg......................... | 260/94.7 |
| 3,639,522 | 2/1972 | Narayana et al................ | 260/880 B |
| 3,676,409 | 7/1972 | Duck et al. ..................... | 260/80.78 |

*Primary Examiner*—Joseph L. Schofer
*Attorney, Agent, or Firm*—Stevens, Davis, Miller & Mosher

[57] ABSTRACT

A dihalocyclopropane functional multi-component copolymer is produced by reacting olefin bond units contained in the side chain or in the cyclic group in the main chain of a multi-component copolymer with dihalocarbene generated from halogenated hydrocarbon in the presence of a cation surfactant catalyst by using an alkali aqueous solution. The dihalocyclopropane functional multi-component copolymer has an excellent compatibility as a polymer to be blended with the general purpose rubber and as a halogenated rubber series industrial material.

2 Claims, 5 Drawing Figures

Blend of modified EPDM/
natural rubber

Blend of modified EPDM/
cis-1,4-polyisoprene

Blend of modified
EPDM/SBR

Blend of modified
EPDM/BR

Blend of EPDM/
natural rubber

Blend of EPDM/
cis-1,4-polyisoprene

Blend of EPDM/SBR

Blend of EPDM/BR

Blend of modified
EPDM/EPDM

METHOD OF PRODUCING DIHALOCYCLOPROPANE FUNCTIONAL MULTICOMPONENT COPOLYMERS

The present invention relates to a method of producing modified high polymers, wherein a high polymer having olefin bond units in the side chain or in the cyclic group in the main chain is modified by introducing dihalocyclopropane functional groups into said olefin bond units. More particularly, the present invention relates to a method of producing dihalocyclopropane functional multi-component copolymers having improved properties, which comprises reacting olefin bond units contained in the side chain or in the cyclic group in the main chain of a multi-component copolymer, which is prepared from at least two $\alpha,\beta$-unsaturated compounds and at least one non-conjugated diolefin compound (hereinafter this copolymer is abridged as multi-component copolymer), with dihalocarbene generated from halogenated hydrocarbon in the presence of a cation surfactant catalyst by using an alkali aqueous solution to introduce dihalocyclopropane functional groups into said side chain or said cyclic group.

Recent progress in the scientific technique demands to develop high polymers having pertinent properties to the use purpose, and high polymers having desired properties have been demanded in elastomers. As the method for developing novel high polymers by modifying well known high polymers, graft or block copolymerization, formation of derivatives by a chemical reaction, and polymer blending have been effected, but desired products have often been found it difficult to be obtained by these methods. For example, in the polymer blending method, there is a limitation in view of the compatibility of polymers to be blended, and the development of high polymers is hindered by this defect.

It has recently been found out that ethylene/propylene copolymer has rubbery elasticity, and further the property of said copolymer has been improved by adding non-conjugated diolefin compound to the copolymer as the third component to provide cross-linking reactivity to the copolymer. These ethylene/propylene/cyclopentadiene or 1,4-hexadiene multi-component copolymers not only have an excellent rubbery elasticity, but also have a high ozone resistance due to absence of olefin bond units in the main chain. However, these multi-component copolymers are still considerably inferior in cross-linking reactivity to general purpose rubbers, such as natural rubber, polyisoprene, polybutadiene and styrene/butadiene copolymer rubber, require vulcanization at high temperature for a long period of time, and are very poor in compatibility with the general purpose rubbers. Heretofore, in order to improve the serious drawbacks in these multi-component copolymers, for example, cross-linking reactivity, compatibility, tackiness and adhesivity, various processes have been attempted. For example, the following prior arts, wherein the properties of the multi-component copolymers are improved by utilizing the formation of derivatives by chemical reaction of olefin bond units present in the side chain or in the cyclic group in the main chain of the multi-component copolymers, have been disclosed.

Use of polyorganohydrosiloxane (Japanese Patent Application Publication No. 13,525/67), Graft-copolymerization of the copolymer with resin-formable monomer (Japanese Patent Application Publication No. 16,394/68), Grafting of phosphorus-, sulfur- or arsenic series monofunctional acid (Japanese Patent Application Publication No. 32,423/69), Formation of room temperature hardening rubber by means of silane compound (Japanese Patent Application Publication No. 11,819/70), Introduction of carboxyl groups by the reaction of the copolymer with dibasic- or polybasic acid (Japanese Patent Application Publication No. 20,305/68 and No. 13,591/70), Reaction of the copolymer with hydrogenated resin and organic peroxide (Japanese Patent Application Publication No. 30,942/70), Grafting of epoxy groups, hydroxy groups, or maleic acid groups (Japanese Patent Application Publication No. 26,305/68 and United States Patent No. 3,448,174 specification), Graft copolymerization of an ozonolysis product of the copolymer with polystyrene in the presence of styrene (Japanese Patent Application Publication No. 16,911/65), and Production of high molecular weight polycarbonyl compounds by the oxidation with ozone (Japanese Patent Application Publication No. 16,910/65).

Particularly, as a prior art relating to the improvement of the compatibility of the multi-component copolymer concerning the present invention, a method, wherein olefin bond units in the multi-component copolymer are reacted with bromine to add two bromine atoms to one olefin bond unit in order to improve the compatibility of the copolymer with the general purpose rubber, has been known (U.S. Pat. No. 3,524,826 specification). However, there is no prior art wherein the carbene reaction is applied to the multicomponent copolymer. Therefore, the dihalocyclopropane functional multi-component copolymer of the present invention is a novel modified high polymer which has never been known. Furthermore, it is a novel and surprising fact which has never been expected that the compatability of the multicomponent copolymer with the general purpose rubber having a high content of olefin bond units can be remarkably improved by such modification.

The inventors have already succeeded in the production of an aldehyde functional multi-component copolymer having aldehyde functional groups in the side chain or in the cyclic group in the main chain, which is characterized by subjecting olefin bond units of a multi-component copolymer to ozonolysis, and then reducing the resulting product with a trivalent phosphorus compound, and filed a patent application in U.S.A. The inventors further continued investigations for the production of modified multi-component copolymers and achieved the present invention. According to the method of the present invention, it has been able to obtain a modified multi-component copolymer having novel properties, which have never been obtained heretofore, from a well-known multi-component copolymer containing a non-conjugated diolefin compound as the third component by converting the olefin bond units into dihalocyclopropane functional groups regardless of the kind of the non-conjugated diolefin compound to be used. The modified multi-component copolymer of the present invention has novel properties due to the dihalocyclopropane functional groups. Accordingly, the modified copolymer is an excellent polymer for producing a blend polymer with the general purpose rubber and is a useful halogenated rubber series industrial material to be used as base material for elastomer, base material for oil extended elastomer, compounding ingredient or processing aid for other elastomers, base material of liquid rubber and resin, and adhesive.

The multi-component copolymers to be used in the present invention are produced from at least two $\alpha,\beta$-unsaturated compounds and at least one non-conjugated diolefin compound. The $\alpha,\beta$-unsaturated compounds are ones having two to eight carbon atoms, such as ethylene, propylene and the like. The non-conjugated diolefin compounds include (a) straight-chain aliphatic dienes, such as 1,4-hexadiene, 1,5-hexadiene, 1,6-octadiene and the like; (b) branched chain aliphatic dienes, such as 5-methyl-1,4-hexadiene, 3,7-dimethyl-1,6-octadiene, 3,7-dimethyl-1,7-octadiene and the like; (c) monocyclic alicyclic dienes, such as 1,4-cyclohexadiene, 1,5-cyclooctadiene, 1,5-cyclododecadiene, 4-vinylcyclohexene, 1-allyl-4-isopropylidenecyclohexane, 3-allylcyclopentene, 4-allycyclohexene, 1-isopropenyl-4-(4-butenyl)cyclohexane and the like; and (d) polycyclic alicyclic dienes, such as tetrahydroindene, methyltetrahydroindene, dicyclopentadiene, bicyclo-(2,2,1)-hepta-2,5-diene, alkenyl-, alkylidene-, cycloalkenyl- and cycloalkylidene-norbornene, such as 5-methylenenorbornene, 5-ethylideneorbornene, 5-propenylnorbornene, 5-isopropylidenenorbornene, 5-(4-cyclopentenyl)norbornene, 5-cyclohexylidenenorbornene and the like. However, the non-conjugated diolefin compounds are not limited to these dienes.

A preferred multi-component copolymer to be used in the present invention is a terpolymer prepared from ethylene, propylene and a non-conjugated diolefin compound, and this terpolymer is usually called as EPDM. The multicomponent copolymer will be explained in more detail with reference to the EPDM, but the copolymer is not limited to the EPDM.

The composition ratio of monomers constituting the EPDM is not particularly limited, and 30 to 85 mol% of ethylene, 15 to 70 mol% of propylene and 1.0 to 10 mol% of a non-conjugated diolefin compound are generally used. Further, the molecular weight of the EPDM is not particularly limited, and EPDM ranging from liquid EPDM to EPDM having a number average molecular weight of 350,000 is used depending upon the purpose. The preparation method of the EPDM is disclosed in various patent specifications, for example, in U.S. Pat. Nos. 2,933,480, 3,000,866 and 3,093,621 specifications.

It is generally considered that one of the double bonds contained in the molecule of the non-conjugated diolefin compound, which is the third component constituting the EPDM, serves to form a terpolymer of the non-conjugated diolefin compound with ethylene and propylene, and another double bond remains in the side chain or in the cyclic group in the main chain and contributes to the unsaturation property and the cross-linking reactivity of the EPDM. The present invention relates to the conversion of the olefin bond remaining in the EPDM molecule into dihalocyclopropane bond by the reaction of the olefin bond with dihalocarbene.

There have been known a large number of reports concerning the scientific fundamental researches on the carbene reaction which can be utilized in the present invention. For example, W. Kirmse, "Carbene Chemistry" published by Academic Press, N.Y., 1964; J. Hine, "Divalent Carbon" published by Ronald Press, N.Y., 1964; "Chem. & Eng. News," June 16, page 60 and June 30, page 50, 1969 (R.A. Moss, "Carbene Chemistry," Parts I and II); and S. Otsuka, "New Synthesis by Metal Complex," page 235, 1970 (J. Furukawa et al, "Carbenoid Reaction," Kagakuno Ryoiki, Special Number 89).

The carbene is a bivalent carbon compound, and typical examples of the carbene are carbene :CH$_2$, dihalocarbene :CX$_2$ (X is F, Cl, Br or I), carboalkoxycarbene

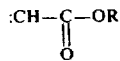

and the like. All these carbenes are unstable intermediates having a very high reactivity. The carbene reactions utilizing these carbenes include cyclopropane-forming reaction by addition of carbene to carbon-carbon double bond, insertion reaction of carbene between carbon-hydrogen bond, abstraction reaction of hydrogen from carbon-hydrogen bond, and the like. The carbene is classified into two groups in a narrow sense, i.e., carbene which is a bivalent carbon compound, and carbenoid in which the carbene is bonded to a metal. In general, the term "carbene" in a broad sense includes these two groups. The carbene in a narrow sense which is formed by decomposition of a diazo compound and a ketone derivative by light or heat involves two electron states of singlet state and triplet state. However, when it is taken into account to form cyclopropane derivatives by the addition of carbene to olefin, which is an important reaction in the synthetic chemistry, the singlet carbene is inserted between the carbon-hydrogen bond, and the triplet carbene shows a radical property and causes the abstraction reaction of hydrogen. Consequently, both of the singlet carbene and triplet carbene have poor stereo-selectivity, and such carbenes are not preferred. On the other hand, carbenoid adds to olefin setereospecifically and stereo-selectively and hardly causes the insertion reaction between the carbon-hydrogen bond and further does not cause the abstraction reaction of hydrogen, and therefore carbenoid has a high useful merit. The present invention relates to the use of the carbenoid according to the above narrow definition for the addition to olefin bond units contained in the multi-component copolymer.

A method for synthesizing dichlorocyclopropane derivatives by the reaction of olefins with dichlorocarbene has been discovered by Doering in the year of 1954 [W. von E. Doering and A. K. Hoffman, JACS. Vol. 76, page 6162 (1954)]. Later, various processes for synthesizing carbene have been developed. However, since carbene is easily hydrolyzed, all of these processes must be effected under absolutely anhydrous state. A large number of investigations, wherein a carbene-forming reaction under absolutely anhydrous state is utilized for improving properties of elastomer, such as conjugated diene polymer having a high content of olefin bond units, have been commonly known. For example, studies for introducing dichlorocyclopropane functional groups into the main chain by reacting dichlorocarbene with polyisoprene or polybutadiene have been disclosed by Pinazzi et al [Comp. Rend., Vol. 256, page 2390 (1963); Vol. 258, pages 2607 and 4982 (1964); Vol. 260, page 3393, (1965); Vol. C-263, page 859 (1966) and Vol. C-264, page 288 (1967)), and J. Lal et al (J. Polymer Sci., A-1, Vol. 4, page 1637 (1966)]. Studies for reacting carboalkoxycarbene as well as dichlorocarbene have been disclosed by I.S. Lishanskii et al [Vyskomol. Soyed, Vol. 8, No. 1, page 186(1966)]. Furthermore, as a prior art having a relation to the present invention, wherein dihalocarbene reaction is applied to rubbery polymer, only British Pat. No. 1,010,125 has hitherto been known. In this British patent, olefin bond units remaining in a conjugated diene polymer are reacted with dihalocarbene under absolutely anhydrous state to introduce halogen bonds into the polymer and to give chlorinated rubber-like properties to the polymer, and the example describes only the use of cis-1,4-polyisoprene. In the method of the British patent, it is not clear whether a formation reaction of dihalocyclopropane functional group proceeds to modify the structure of the polymer or a chemical reaction wherein carbene is inserted between carbon-hydrogen bond to effect methylation is caused. However, in the claim, there is a description that the method can be also applied to polymers, such as polydiolefin, polyester, polyamide, polyurethane, polycarbonate and polyether.

The present invention is different from such conventional carbene-forming reaction, and relates to an application of a novel carbene addition reaction to the improvement of properties of multi-component copolymer. The basic idea of this novel carbene addition reaction has been firstly found out by M. Makosza and M. Wawrzyniewicz [Tetrahedron Letters, No. 53, page 4659 (1969)]. The inventors have further developed and applied this method to the improvement of properties of polymers, and achieved the present invention. Particularly, the present invention aims to improve the compatibility of a multi-component copolymer having a low-content of olefin bond units in the side chain or in the cyclic group in the main chain with the general purpose rubber and to improve other properties of the copolymer by applying the above described method to the copolymer.

Since the multi-component copolymer to be used in the present invention has a low content of olefin bond units, the carbene reaction for forming the dihalocyclopropane must be effected in a high reactivity and in a high yield. The inventors, as shown in the following Examples and Comparative Examples, have made experiments for introducing dichalocyclopropane functional groups into a multi-component copolymer by the conventional carbene reaction developed by Doering et al, which is carried out under absolutely anhydrous state, and by the novel carbene reaction found out by Makosza et al, which is carried out in an aqueous solution. As the result of the experiments, it has been found that in the conventional Doering method, the yield is low and the actual formation of the reaction product cannot be ascertained, while in the Makosza method, the addition reaction of dihalocarbene proceeds in a very high yield. Further, it has been found that the multi-component copolymer modified by the addition of dihalocarbene has a remarkably improved compatibility with the general purpose rubber as shown in microphotographs in FIGS. 3A and 3B. These are surprising facts which can never been anticipated from conventional knowledge. According to the present invention, dihalocyclopropane functional groups can be easily introduced into the multi-component copolymer in a moderate reaction condition and in a high yield. Therefore, the method of the present invention is remarkably excellent as a method for producing modified multi-component copolymers having a novel structure suitable for blending the copolymer with the general purpose rubber and for other use purposes.

The structure of the dihalocyclopropane functional multi-component copolymers produced by the method of the present invention will be explained with reference to EPDM used in the following Examples.

1. In the case when the third component is 1,4-hexadiene:

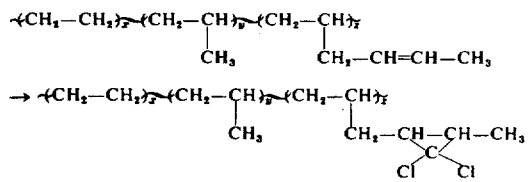

2. In the case when the third component is 5-ethylidene-2-norbornene:

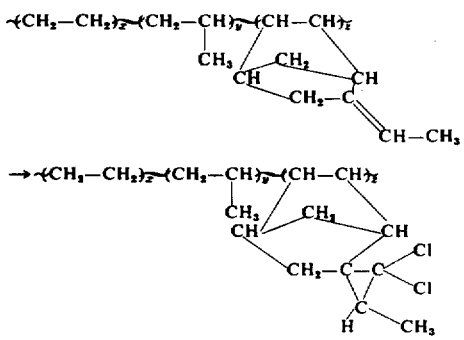

3. In the case when the third component is dicyclopentadiene:

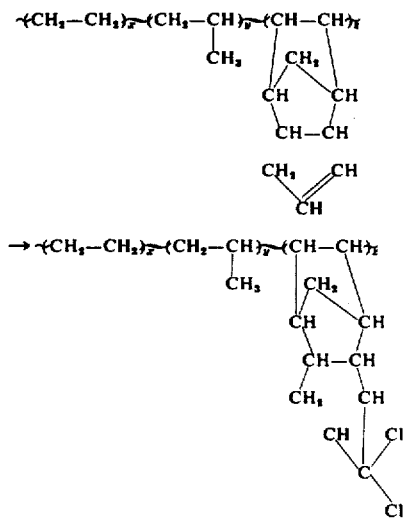

In addition to the improvement of the compatibility with the general purpose rubber, the modified multi-component copolymer of the present invention will supposedly have an improved heat resistance, and resistance against ozonolysis, and further the copolymer can effect a cross-linking reaction by utilizing halogen in the dihalocyclopropane functional group.

In the present invention, the starting multicomponent copolymer selected depending upon the purpose is dissolved in a proper solvent. In the present invention, dihalocarbene is generated from halogenated hydrocarbon, and when dichlorocyclopropane functional group is to be introduced, chloroform is used as an essential component, and when dibromocyclopropane functional group is to be introduced, bromoform is used as an essential component. When the starting multi-component copolymer is soluble in these halogenated hydrocarbons, these halogenated hydrocarbons alone can be used as a solvent. While, when the starting multi-component copolymer is hardly soluble in these halogenated hydrocarbons alone, a mixed solvent composed of the halogenated hydrocarbon and at least one of compounds inert to the carbene reaction is used. As the compound to be used for the mixed solvent, mention may be made of aliphatic hydrocarbons, such as pentane, hexane, heptane and the like; aromatic hydrocarbons, such as benzene, toluene, mixed xylene and the like; halogenated hydrocarbons, such as carbon tetrachloride and the like; aliphatic or cyclic ethers, such as diethyl ether, tetrahydrofuran, dioxane and the like. However, these compounds are not limitative. Among these compounds, hexane, heptane, benzene and toluene are preferable to be used in the mixed solvent, and heptane and toluene are particularly preferable. The amount of the solvent to be used is optional. However, in general, when the amount is too small, a reaction product having unreacted olefin bond units is apt to be precipitated before the olefin bond units in the multicomponent copolymer are completely reacted with dihalocarbene, and accordingly it is preferred to use solvent in an amount as large as possible. In general, the concentration of the solution is preferably not higher than 10 g/l, and in particular preferably within the range of 1 to 5 g/l.

The catalyst to be used in the present invention is cation surfactant catalyst, and includes tetraalkylammonium chloride, tetraalkylammonium bromide, trialkylbenzylammonium chloride, trialkylbenzylammonium bromide, alkylpyridinium chloride, alkylpyridinium bromide and the like. However, these compounds are not limitative. Among these compounds, triethylbenzylammonium chloride and triethybenzylammonium bromide are preferable. The addition amount of the catalyst can be selected optionally depending upon the purpose, but the amount is usually 1 to 50% by weight, preferably 1 to 5% by weight based on the multi-component copolymer.

The alkali aqueous solution to be used in the present invention is prepared from sodium hydroxide or potassium hydroxide. The concentration of the alkali aqueous solution is not particularly limited, and can be selected optionally depending upon the purpose. Since a sodium hydroxide aqueous solution used in the saponification of neutral fat and oil in the commercial production of hard soap is concentrated up to 50%, this 50% sodium hydroxide aqueous solution can be directly used in the present invention. The alkali aqueous solution is used in an optional amount, but is usually used in an amount of 1/10 – 1/50 (volume ratio calculated as 50% alkali hydroxide aqueous solution) based on solution of the multi-component copolymer.

In the present invention, the addition order of the above described components is not particularly limited, but, in general, the following addition order is preferably used. That is, a cation surfactant catalyst is added to a solution of the multi-component copolymer while stirring, and then an alkali aqueous solution is gradually added thereto while continuing the stirring.

In the present invention, the reaction can be effected at an optional temperature. The reaction proceeds sufficiently at room temperature. The reaction time is selected within 1 to 24 hours depending upon the purpose. In general, when the reaction is effected at room temperature under stirring, all the olefin bond units are converted into dihalocyclopropane functional groups in 10 to 15 hours. After completion of the reaction, the solution layer containing the modified multi-component copolymer is washed thoroughly with a large amount of water, and then the modified multi-component copolymer is purified by an optionally selected conventional purification process.

Figure 2:
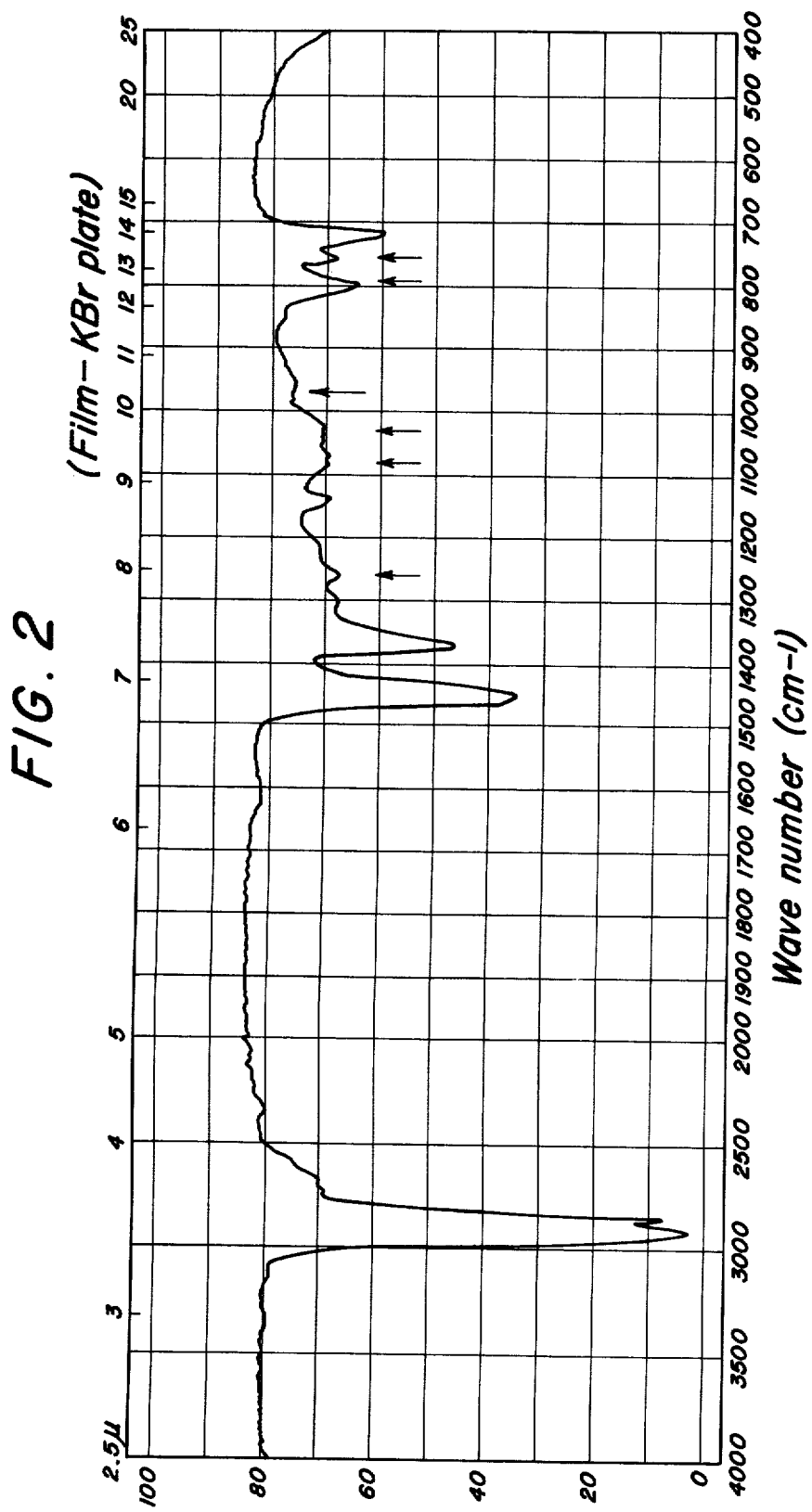
Figure 3A:
Figure 3A:
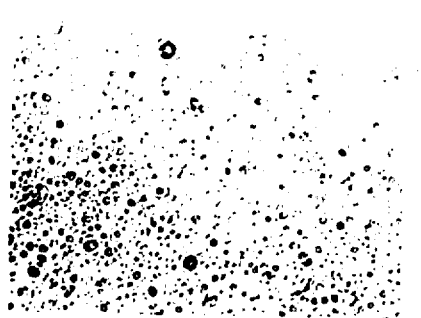
Figure 3A:
Figure 3A:
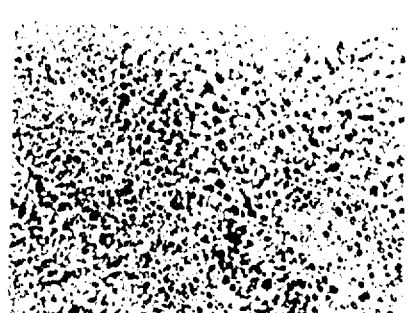
Figure 3B:
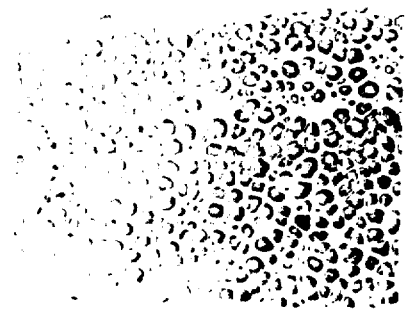
Figure 3B:
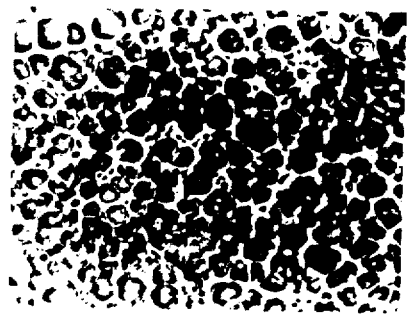
Figure 3B:
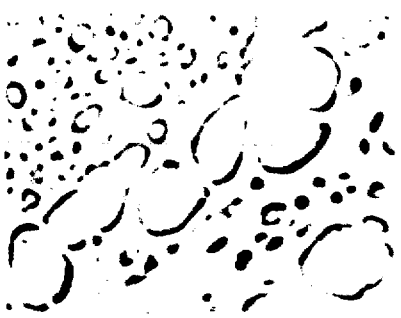
Figure 3B:
Figure 3C:
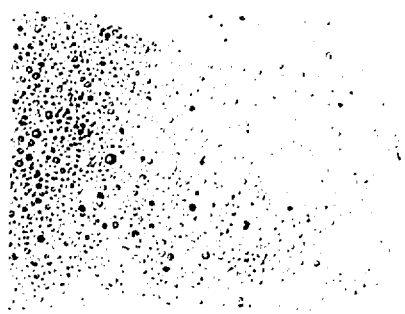

For a better understanding of the present invention, reference is taken to the accompanying drawings, wherein:

FIG. 1 represents an infrared absorption spectrum of EPDM Nordel 1070 used as a starting material in Example 1 of the present invention;

FIG. 2 represents an infrared absorption spectrum of dichlorocyclopropane functional EPDM Nordel 1070 produced in Example 1 of the present invention; and FIGS. 3A to 3C represent photomicrographs showing a comparison of the dichlorocyclopropane functional EPDM Nordel 1070 produced in Example 1 of the present invention with the starting EPDM Nordel 1070 in the compatibility with the general purpose rubber. FIG. 3A represents photomicrographs showing compatabilities of the dichlorocyclopropane functional EPDM Nordel 1070 with general purpose rubbers of natural rubber, cis-1,4-polyisoprene, SBR and BR. FIG. 3B represents photomicrographs showing compatibilities of the starting EPDM Nordel 1070 with the same general purpose rubbers as described above. FIG. 3C represents a photomicrographs showing compatibility of the dichlorocyclopropane functional EPDM Nordel 1070 with the starting EPDM Nordel 1070.

The following Examples are given in illustration of this invention and are not intended as limitations thereof.

EXAMPLES 1 TO 4

Each of the following three kinds of commercially available EPDM, i.e., Nordel 1070 (trademark of ethylene/propylene/1,4-hexadiene copolymer made by Du Pont Inc., 1,4-hexadiene content is 1.7 mol%), Epsyn 55 (trademark of ethylene/propylene/ethylidenenorbornene made by Copolymer Inc., ethylidenenorbornene content is 3.7 mol%) and Royalene 306 (trademark of ethylene/propylene/dicyclopentadiene copolymer made by Uniroyal Inc., dicyclopentadiene content is 2.9 mol%), was dissolved in chloroform so as to prepare respectively an about 5% solution of the EPDM in chloroform. The EPDM was reprecipitated by adding acetone to the solution, and gel was filtered off by means of a wire gauze to obtain a purified EPDM. Gel content of Nordel 1070 was about 0.6% by weight, and that of Royalene 306 was about 8% by weight. In the case of Epsyn 55, the wire gauze was clogged with gel, and it was impossible to determine accurate gel content.

Into a four neck separable flask of 5l capacity were charged 15 g of the thus purified EPDM and 3.5l of chloroform, and the resulting mixture was stirred for 1 day at room temperature to dissolve completely the EPDM in the chloroform. To this solution was added 4 g of triethylbenzylammonium chloride (hereinafter abridged as TEBA-Cl) and stirred thoroughly, followed by addition of 100 ml of a 50% sodium hydroxide aqueous solution, which had previously been prepared by adding 500 g of water to 500 g of sodium hydroxide, by means of a dropping funnel in about 1 hour while stirring the reaction solution. After completion of the addition, the reaction solution was stirred vigorously for about 10 hours at room temperature. During the addition, the reaction solution changed from colorless transparency to light yellow opaque, and 3 hours after stirring, the reaction solution changed to light brown, and a small amount of precipitate was separated out and deposited on the wall of the flask. When the reaction solution was left to stand for 24 hours after completion of the stirring, a lower concentrated sodium hydroxide aqueous solution layer and an upper viscous blackish brown chloroform layer were separated. The aqueous solution layer was separated and removed by means of a separating funnel, and the chloroform layer was washed with water thoroughly. Then, a large amount (600 ml) of n-hexane was added to the chloroform layer to precipitate an inorganic substance which was probably sodium chloride. After the inorganic substance was filtered off, the resulting crude polymer was reprecipitated and purified by using methanol in a conventional manner and then dried thoroughly under vacuum.

Further, the EPDM Nordel 1070 was treated in the same manner as described above, except that triethylbenzylammonium bromide (hereinafter abridged as TEBA-Br) was used as a catalyst instead of TEBA-Cl.

The following Table 1 shows the result of the above described experiments. FIG. 1 represents an infrared absorption spectrum of the EPDM Nordel 1070 used as a starting material in Example 1, and FIG. 2 represents an infrared absorption spectrum of the polymer produced from the EPDM Nordel 1070 by using TEBA-Cl as a catalyst in Example 1.

method of the present invention is remarkably superior to the conventional method in the addition of dihalocarbene to olefin bond units contained in the multi-component copolymer.

Then, an infrared absorption spectrum of the modified polymer of the present invention and that of the modified polymer produced in the following Comparative Example, which were formed from EPDM Nordel 1070, were compared to obtain the following results. The infrared absorption spectrum of the polymer produced by a conventional method described in Comparative Example is somewhat decreased in the intensity of the absorption at 967 cm$^{-1}$ (refer to FIG. 1) assigned to the olefin bond in the starting EPDM Nordel 1070 but otherwise said spectrum is exactly same as that of the starting EPDM Nordel 1070. On the contrary, in the resulting polymer obtained in the method of the present invention described in Example 1, as seen from the infrared absorption spectrum (refer to FIG. 2), the absorption at 967 cm$^{-1}$ assigned to the olefin bond in the starting EPDM Nordel 1070 is completely diminished, and absorptions newly appear at 1,260, 1,080, 1,030, 795 and 755 cm$^{-1}$. From the analysis of infrared absorption spectrum in a model experiment of an addition reaction of dichlorocarbene to 1,7-octadiene and a literature [C. Pinazzi et al, Compt. Rend., Vol. C-263, page 859 (1966) and Vol. C-164, page 288 (1967)], it is clear that the absorptions at 1,080 and 1,030 cm$^{-1}$ are assigned to cyclopropane ring and the absorptions at 795 and 755 cm$^{-1}$ are assigned to gem-chlorine atoms in the cyclopropane ring. The above described infrared absorption spectrum analysis and chlorine content clearly indicate that in the method of the present invention dihalocarbene is added to an olefin bond unit in the multi-component copolymer to form a dihalocyclopropane functional group.

EXAMPLE 5

In this example, in order to clarify the characteristic property of the dihalocyclopropane functional multi-

TABLE 1

| Example No. | Starting EPDM | Catalyst | [1]Yield (%) | Cl (% by weight) | |
|---|---|---|---|---|---|
| | | | | [2]Found | Calculated |
| 1 | Nordel 1070 | TEBA-Cl | 78.1 | 3.53 | 3.26 |
| 2 | Epsyn 55 | TEBA-Cl | 87.4 | 12.08 | 6.99 |
| 3 | Royalene 306 | TEBA-Cl | 58.7 | 6.41 | 5.61 |
| 4 | Nordel 1070 | TEBA-Br | 83.2 | 3.88 | 3.26 |

[1]Yield is calculated based on the weight of the starting EPDM
[2]Measured by means of a Schöniger flask combustion method.

As seen from the above Table 1, it has been confirmed that the method of the present invention using a cation surfactant catalyst together with an alkali aqueous solution can effect smoothly an addition reaction of dichlorocarbene in a high yield. The reason why all the found values of chlorine content are larger than the theoretical value is probably due to impurities, such as sodium chloride, remained in the resulting copolymer and to errors in the measurement. As shown in the following Comparative Examples 1 to 2, when the addition reactions of dichlorocarbene were effected by using EPDM Nordel 1070 in the conventional method under absolutely anhydrous state, and chlorine contents of the resulting polymers were analyzed in the same procedure as described above, the chlorine contents were found to be 1.86% by weight and 2.28% by weight as shown in Table 2. This shows that the component copolymer produced by the method of the present invention, dichlorocyclopropane functional EPDM Nordel 1070 was compared with EPDM Nordel 1070 in the compatibility with the general purpose rubber. General purpose rubbers used in this comparison test of compatibility were natural rubber (NR-2200), cis-1,4-polyisoprene (Natsyn 2200), styrene-butadiene copolymer rubber (Solprene 1040), cis-1,4-polybutadiene (BR01) and EPDM Nordel 1070. The compatibility was examined in the following manner. Into 30 ml of chloroform were charged 0.4 g of dichlorocyclopropane functional EPDM Nordel 1070 and 0.1 g of a general purpose rubber, and the resulting mixture was stirred for about 1 day at room temperature to prepare a homogeneous solution. The resulting solution was dropped on a glass plate by means of a dropping pipet. The chloroform was evaporated into air to form a thin film of the polymer mixture, and then a microphotograph of the film was taken. The same procedure was further effected with respect to EPDM Nordel 1070. FIGS. 3A and 3B represent microphotographs of the films, and shows comparison of dichlorocyclopropane functional EPDM Nordel 1070 with EPDM Nordel 1070 in the compatibility with the above described general purpose rubbers. As seen from the microphotographs, the compatibility of EPDM with the general purpose rubber is remarkably improved by converting the EPDM into dichlorocyclopropane functional EPDM by the method of the present invention.

COMPARATIVE EXAMPLES 1 TO 2

An egg-plant type flask of 100 ml capacity equipped with a three way cock was thoroughly dried under nitrogen atmosphere. Then, in the flask, white powdery potassium tert-butoxide was synthesized from metallic potassium and tert-butyl alcohol in a conventional manner and then dispersed thoroughly in 100 ml of a solvent as shown in the following Table 2. Then, 0.95 g of EPDM Nordel 1070 was added to the dispersion, and after the resulting mixture was left to stand for 24 hours at room temperature to form a solution, the flask was once cooled to 0° to 10°C and then 3 ml of purified chloroform was added to the solution while stirring. When 2 or 3 drops of chloroform was added thereto, the reaction solution caused gel formation and stirring by means of a stirrer became impossible, and therefore the flask was shaken vigorously by hand. When the predetermined amount of chloroform was added to the reaction solution, the viscosity of the reaction solution was again decreased and stirring was able to be effected by means of a stirrer. After the stirring was continued for about 6 hours, the reaction solution was left to stand at room temperature for one night. The precipitate was removed by means of a centrifuge, and the resulting polymer was purified by reprecipitation with a tert-butyl alcohol/toluene system and then dried.

The obtained result is shown in the following Table 2.

TABLE 2

| Comparative Example No. | Starting EPDM | Solvent | [1]Yield (%) | Cl (% by weight) | |
|---|---|---|---|---|---|
| | | | | [2]Found | Calculated |
| 1 | Nordel 1070 | toluene | 77.6 | 2.28 | 3.26 |
| 2 | Nordel 1070 | hexane | 63.8 | 1.86 | |

[1]Yield is calculated based on the weight of starting EPDM.
[2]Measured by means of a Schoniger flask combustion method.

The infrared absorption spectrum of the resulting polymer was somewhat decreased in the intensity of the absorption at 976 cm$^{-1}$ assigned to the olefin bond, but otherwise any new absorption was not found and said spectrum was substantially consistent with the infrared absorption spectrum of the starting EPDM Nordel 1070.

What is claimed is:

1. A dihalocyclopropane functional multi-component copolymer containing dihalocyclopropane functional groups in the side chain or in the cyclic group in the main chain, which is obtained by subjecting a multi-component copolymer prepared from at least two alpha olefins having 2–8 carbon atoms and at least one non-conjugated diolefin compound to the reaction with dihalocarbene generated from halogenated hydrocarbon in the presence of a cation surfactant catalyst selected from the group consisting of tetraalkylammonium chloride, tetraalkylammonium bromide, trialkylbenzylammonium chloride, trialkylbenzylammonium bromide, alkylpyridinium chloride and alkylpyridinium bromide by using an alkali-aqueous solution to introduce dihalocyclopropane functional groups into said said chain or said cyclic group.

2. The product as claimed in claim 1, wherein said multi-component copolymer is EPDM composed of 30–85 mol% of ethylene, 15 to 70 mol% of propylene and 1.0–10 mol% of nonconjugated diolefin compound.

* * * * *